United States Patent
Koepele, Jr.

(10) Patent No.: US 6,434,742 B1
(45) Date of Patent: Aug. 13, 2002

(54) SYMBOL FOR AUTOMATICALLY RENAMING SYMBOLS IN FILES DURING THE COMPILING OF THE FILES

(75) Inventor: John Curtis Koepele, Jr., Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/307,942

(22) Filed: May 10, 1999

(51) Int. Cl.[7] ................................. G06F 9/45
(52) U.S. Cl. ................ 717/140; 717/142; 717/151; 717/153
(58) Field of Search ............... 717/4, 5, 8, 9, 717/1, 140, 151, 153, 142, 169, 170; 707/203, 103 FC

(56) References Cited

U.S. PATENT DOCUMENTS

| | | | | |
|---|---|---|---|---|
| 5,588,143 A | * | 12/1996 | Stupek, Jr. et al. | 703/20 |
| 5,715,460 A | * | 2/1998 | Acker et al. | 717/140 |
| 5,732,275 A | * | 3/1998 | Kullick et al. | 717/170 |
| 5,764,992 A | * | 6/1998 | Kullick et al. | 717/170 |
| 5,860,004 A | * | 1/1999 | Fowlow et al. | 717/109 |
| 5,923,880 A | * | 7/1999 | Rose et al. | 717/5 |
| 5,940,074 A | * | 8/1999 | Britt, Jr. et al. | 345/749 |
| 5,956,513 A | * | 9/1999 | McLain, Jr. | 717/5 |
| 5,960,189 A | * | 9/1999 | Stupek, Jr. et al. | 717/169 |
| 5,978,586 A | * | 11/1999 | Baisley et al. | 717/5 |
| 5,978,587 A | * | 11/1999 | Baisley et al. | 717/8 |
| 6,052,526 A | * | 4/2000 | Chatt | 717/5 |
| 6,071,317 A | * | 6/2000 | Nagel | 717/4 |
| 6,145,124 A | * | 7/2000 | Price | 717/9 |
| 6,106,574 A | * | 8/2000 | Baisley et al. | 717/5 |
| 6,141,792 A | * | 10/2000 | Acker et al. | 717/116 |
| 6,199,195 B1 | * | 3/2001 | Goodwin et al. | 717/1 |
| 6,243,766 B1 | * | 6/2001 | Sliger et al. | 710/2 |

\* cited by examiner

*Primary Examiner*—Gregory Morse
*Assistant Examiner*—Chameli C. Das
(74) *Attorney, Agent, or Firm*—Patton Boggs, LLP

(57) ABSTRACT

The present symbol renaming process allows a symbol in a first source code file to be renamed by the linker. This allows new layers of software to be added under an existing interface without recompiling existing code. Symbol renaming in the linker also allows a programmer to easily fix mismatched symbols in linked files without recompiling the source code in all of the linked files. The linker scans a first intermediate object code file to detect a substitution indicator indicating a variable or function in a second file is to be renamed. The symbol to be replaced is read and then the substitution symbol is read. The linker then replaces every occurrence of the symbol as the symbol is read from a second file with the substitution symbol in the intermediate code file generated by the linker.

33 Claims, 7 Drawing Sheets

SYMBOL FOR AUTOMATICALLY RENAMING SYMBOLS IN FILES DURING THE COMPILING OF THE FILES

FIELD OF THE INVENTION

This invention relates to a compiler that generates executable software applications from source code written in a programming language. More particularly, this invention relates to a linker in a compiler that allows symbols in an intermediate object code file and/or library to be renamed without recompiling the source code for the intermediate object code file and/or library.

PROBLEM

In order to produce executable programs for computer systems, computer programmers write source code in a programming language. Some examples of programming languages are C, C++, Fortran, Pascal, and Visual Basic. In order to convert the source code into code that can be read by a processor, the source code is input into a compiler that converts the source code into machine readable code.

It is common for the source code of a software application to be written in many different phases or in many different components. For example, several programmers may each be working on a different aspect of an application or a new feature may be added to an existing application to improve performance of the application. Different flies containing the different components of an application are joined together by a linker in a compiler while the executable code is being generated.

The linker is an editor that checks each file to make sure that the terms or symbols from the different flies agree. For purposes of the present discussion, a symbol is a name identifying any variable or function in the source code. If the symbols for a particular variable or function do not agree in multiple files of an application, the linker detects an error. When an error is detected by the linker, the linker either raises flags indicating possible mismatches or does not allow the files to be compiled into executable code. When a symbol mismatch occurs, the programmer or programmers must go back into each file of source code for the application and find the mismatched symbol. The mismatch must then be corrected and the files must each be recompiled and applied to a link editor. This is a problem because every file containing source code must be corrected and then re-compiled in order to make executable code.

Furthermore, when a file containing a new layer of is added to an application, each source file must be recompiled to assure matching symbols for each object. This is a waste of processing time to recompile unchanged code. It would instead be desirable to allow new layers of software to be added and call an existing defination without recompiling the existing code. There is a need in the art for a process performed by a linder in a compiler that reduces the acount of files that must be recompiled when a new layer of software is added to an application.

SOLUTION

The above and other problems are solved and an advance in the art is made by the system for automatically remaning symbols in files during the compiling of the files, termed "symbol remaning process" herein. Symbol remaning allows a symbol in a first file or library to be remaned by the linker. This allows new layers of software to be added under an existing interface without recompiling existing code. Symbol renaming in the linker also allows a programmer to easily fix mismatched symbols in linked files without recompiling the source code in all of the linked files.

In order to convert source code into executable code, the source files containing the source code must be processed by a compiler, linker, and a constructor. Each source file is first processed by a compiler. The compiler is comprised of a scanner, a parser and a semantic checker. The scanner scans each file to detect each symbol or token in the file. The parser detects the structure of expressions in the language to detect each expression. The semantic checker determines the meaning of each symbol in an expression. The intermediate code generator than generates a file of intermediate object code for each file of source code. The intermediate object code file represents the data structures and functions defined in the source code file as determined by the semantic checker.

After all of the files of source code have been compiled into intermediate object code files, the intermediate object code files are applied to a linker which joins the files of intermediate object code into one file. The linker checks for agreements between symbols declared in each source code file. If there is an error in agreement in symbol types, the linker either flags the error and indicates the error to the programmer(s) or does not allow the files to be linked. After the files have been linked, the resulting file is applied to a constructor which generates an executable file.

The present symbol renaming process performs the symbol renaming in the linker in the following manner. The linker scans a first intermediate object code file to detect a substitution indicator indicating a variable or function in a second file is to be renamed. The symbol to be replaced is read and then the substitution symbol is read. The linker then replaces every occurrence of the symbol as the symbol is read from a second file or library with the substitution symbol in the intermediate code file generated by the linker.

DESCRIPTION OF THE DRAWINGS

This invention can be understood by reading the below detailed description and studying the following drawings.

DETAILED DESCRIPTION

Figure 1:
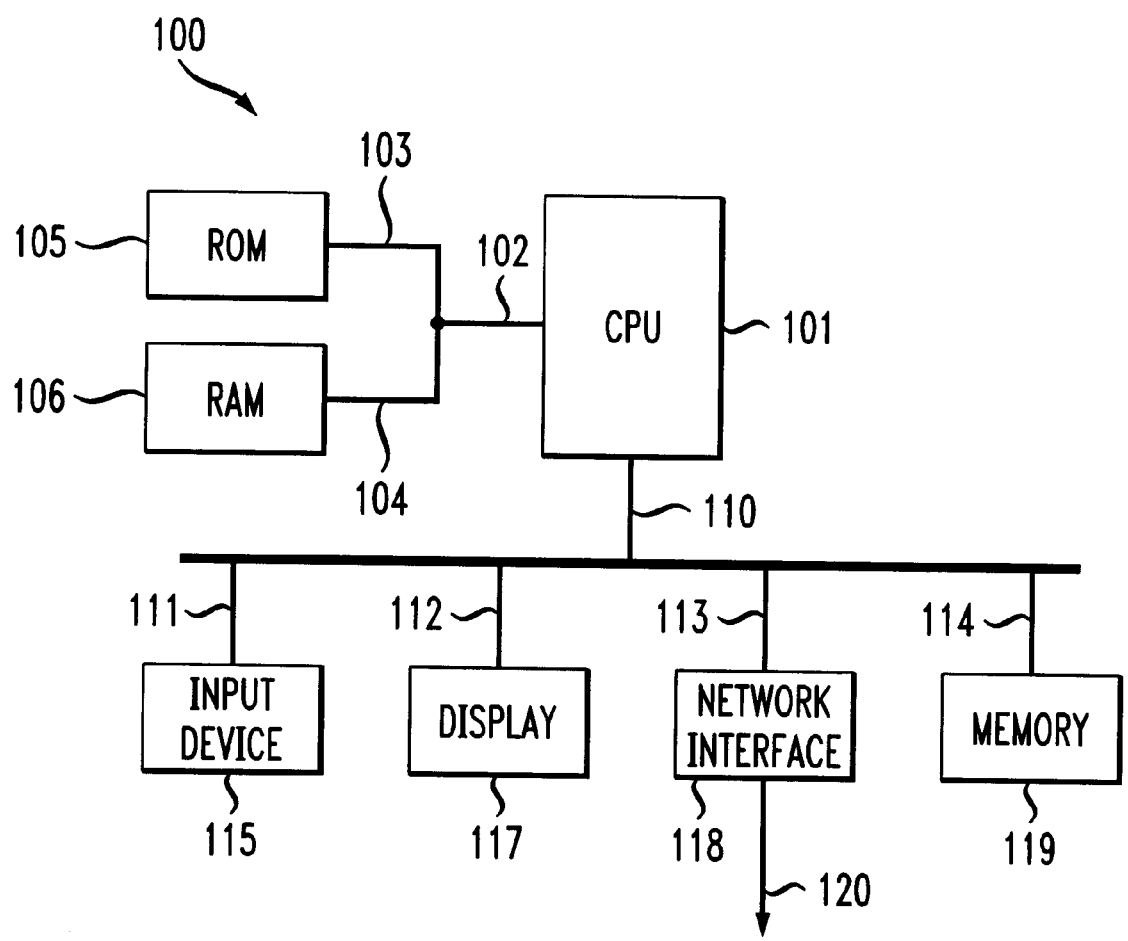
FIG. 1 illustrating a block diagram of a computer processing system.

Exemplary Computer Processing System—FIG. 1

FIG. 1 illustrates a block diagram of an exemplary computer processing system 100 that may execute the software applications that provide symbol renaming in a linker for files and libraries generated in a compiler. Computer processing system 100 has a Central Processing Unit (CPU) 101. CPU 101 is a processor which executes instructions read from memory to run software applications. Memory bus 102 connects CPU 101 with memory units to allow CPU 101 to read and write data to memory. Read Only Memory (ROM) 105 connects to memory bus 102 via path 103. ROM 105 contains instructions that are required to operate computer processing system 100. Random Access Memory (RAM) 106 is connected to memory bus 102 via path 104. RAM 106 stores data and instructions needed to execute software applications.

I/O bus 110 is used by CPU 101 to receive data from and transmit data to I/O devices. I/O devices connected to CPU 101 may include but are not limited to input device 116, display 117, network interface 118, and memory 119. Input device is connected to I/O bus 110 via path 111 and allows a user to input data. Examples of an input device 116 include but are not limited to a keyboard, a mouse, and a microphone. Display 117 is connected to I/O bus 110 via path 112. Display 117 is a video driver and connected display which allows computer system 110 to display data to a user. Network interface 118 is connected to I/O bus 110 via path 113 and connects to a network (not shown) via path 120 to allow communication between computer processing system 100 and other computer processing systems. Some examples of network interface 118 include but are not limited to Ethernet drivers and modems. Memory 119 is a device that stores can store data such a disk drive which can read and write data to a storage media. Media 119 is connected to I/O bus 110 via path 114.

Overview of the Present Invention.

The present symbol renaming process operates by compiling files of source code written in a programming language into executable code. In order to provide symbol renaming in a linker, the processes for the linker and the compiler must be modified. The compiler must be modified to allow a detection of a command to replace a symbol in an object file or library and the linker must be modified to perform the substitution. In the following discussion, an exemplary compiler that could be used to convert a file written in a programming language to an executable file is provided. An overview of the present symbol renaming process is then provided along with the processes for modifying the components of a compiler to provide symbol renaming in a linker. Finally, an exemplary C++ compiler is provided and the modifications to the C++ compiler to provide symbol renaming in a linker are explained.

Figure 2:
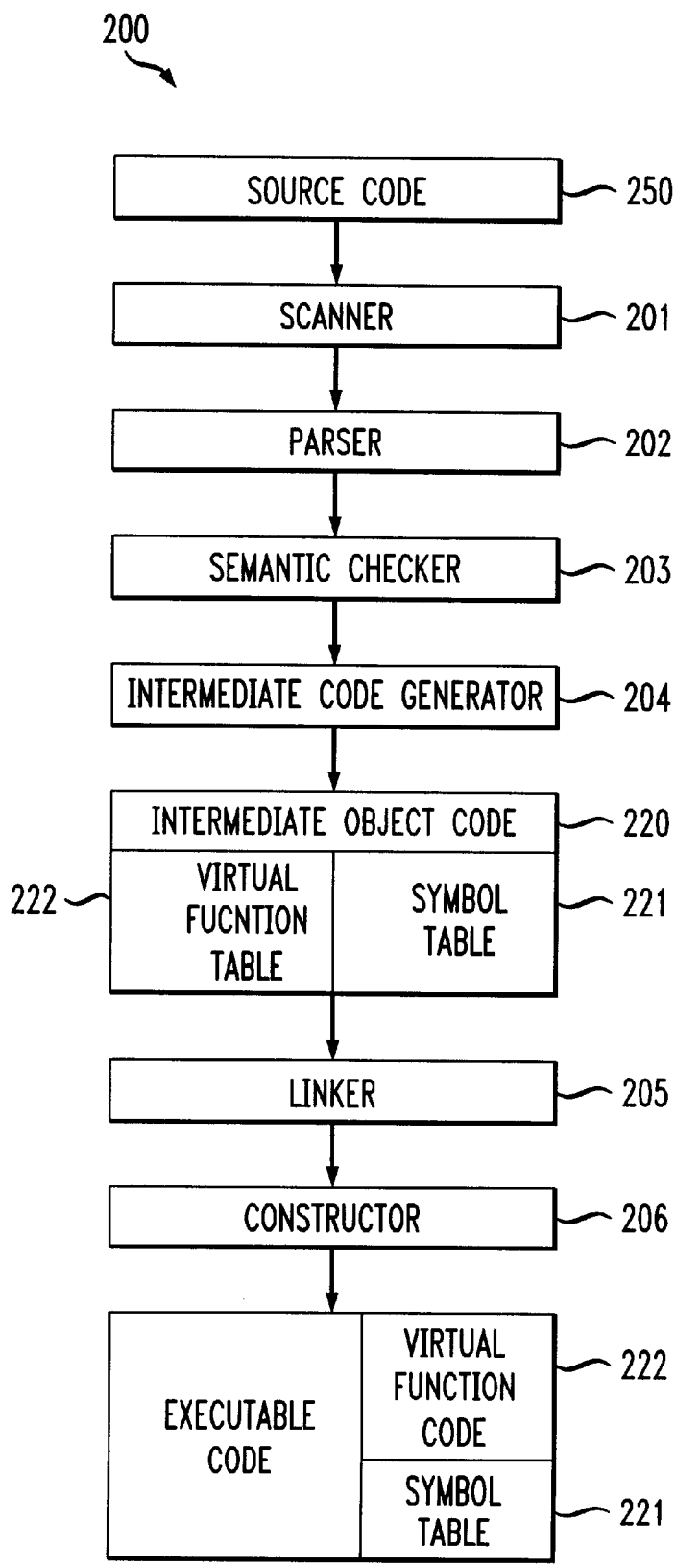
FIG. 2 illustrating a flow diagram of a compiler for an object oriented language.

A Compiler for An Object Oriented Language—FIG. 2

FIG. 2 illustrates an object oriented language compiler that provides symbol renaming in a linker. A specific example of a compiler 200 that provides symbol renaming in a linker is provided in FIG. 7 which illustrates a C++ compiler. In FIG. 2, compiler 200 includes scanner 201, parser 202, semantic checker 203, intermediate code generator 204, linker 205, and constructor 206. Each of the components of compiler 200 is a software application that is executed by computer system 100 to complete the conversion of a source file or multiple source files from a file containing source code written in a programming language into a file containing machine readable code. Those skilled in the art will recognize that any and/or all of the various components may be combined to perform the essential functions of compiler 200.

Compiler 200 receives source code file 250. First, scanner 201 divides source file 250 into individual tokens. Tokens are words and letters. Parser 202 then divides the token into statements in the syntax and grammar of the programming language supported by compiler 200. While the tokens are being divided into statements, parser 202 also detects errors in the syntax of the code in source file 250. Semantic checker 303 then extracts the context independent meaning of tokens or symbols from the parsed source code and determines the meanings of the parsed statements from file 250 in the supported language. Intermediate code generator 204 then generates an intermediate object code file 220 of source file 250. The intermediate object code file 220 may contain a parse tree for the functions and data structures that defines the tokens and statements in source file 250. The intermediate object file 220 for source file 250 also contains a symbol table 221 and virtual function table 222 for each object in source file 250.

Scanner 201, parser 202, semantic checker 203, and intermediate code generator 204 create a symbol table 221 and virtual function table 222 in intermediate object code file 220 as source file 250 is being checked. Symbol table 221 is an array of individual symbol tables for each object in the source file 250. The individual symbol tables include each variable, dynamic and static, declared in an object and are used to determine scope of a variable in an object. The individual symbol tables are then used during creation of the executable code to allocate memory to hold the variables.

Virtual function table 222 is an array of individual functions tables that store the functions that can be performed in each object. There is an individual function table for each object. The virtual function table 222 is used during the creation of executable code to determine that a particular function can be performed on or by an object. If compiler 200 is compiling an object oriented language, the virtual function table is created by storing all of the functions inherited from a super class object into the individual function table for a subclass as well as functions created to specifically manipulate members of the subclass object. for a single application and generates one intermediate object file. As the linker is combining the intermediate object files, linker 205 checks to determine that all functions and classes declared in the files are defined in the resulting intermediate object file. If all of the functions and classes are defined in the resulting file, constructor 206 generates executable code in an executable file from the intermediate object code in the resulting file which includes symbol table 221 and virtual function table 222.

Figure 3:
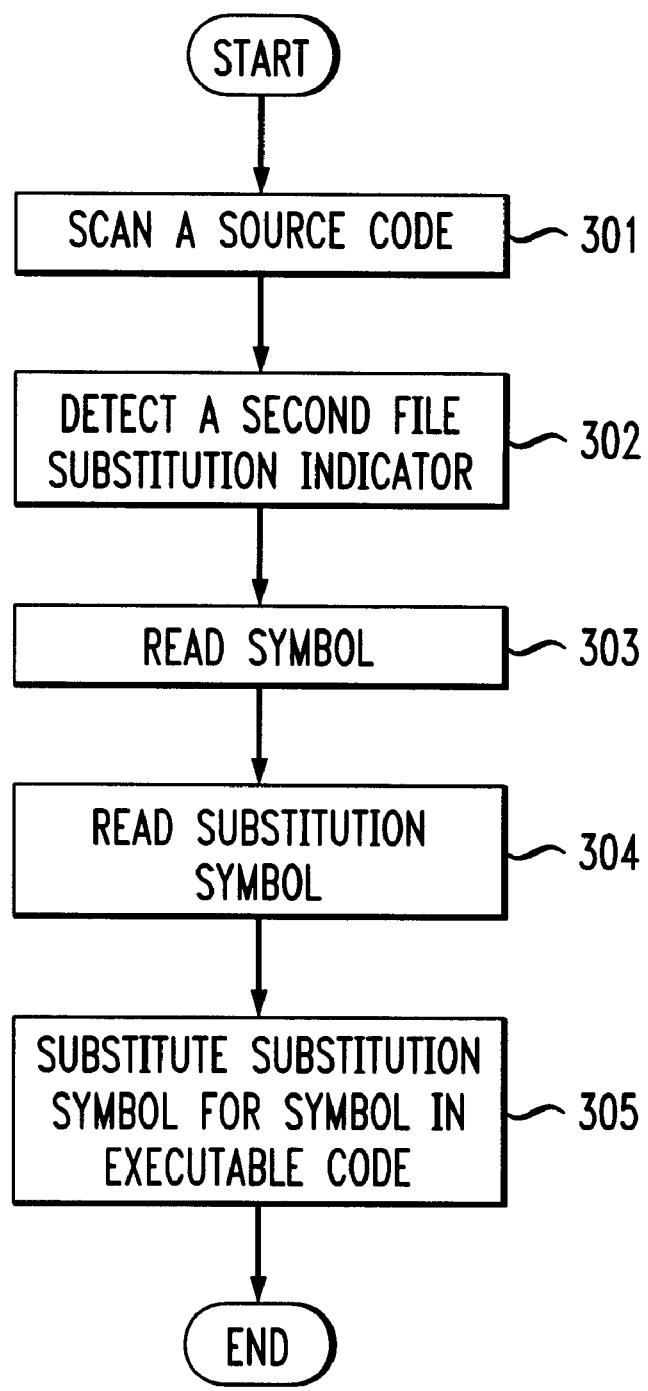
FIG. 3 illustrating a flow diagram of an overview of this invention.

A Process For Renaming Variables in a Linker—FIG. 3

Process 300 illustrated in FIG. 3 is an overview of the present symbol renaming process. Process 300 begins with a first source file being scanned in step 301. In step 302, a second file substitution indicator is detected. The second file substitution indicator is a token that in indicates a substitution for a symbol in a second file is to be made. An example of a commonly known symbol is a #typedefine symbol in C++ which indicates substitution in a file. In response to detecting a second file substitution indicator, the symbol to be replaced is read in step 303. In step 304, the substitute symbol is read from the first file. Process 300 ends after step 305 in which the linker substitutes the substitute symbol for the symbol every time the symbol occurs in the intermediate object code file generated by the linker.

Figure 4:
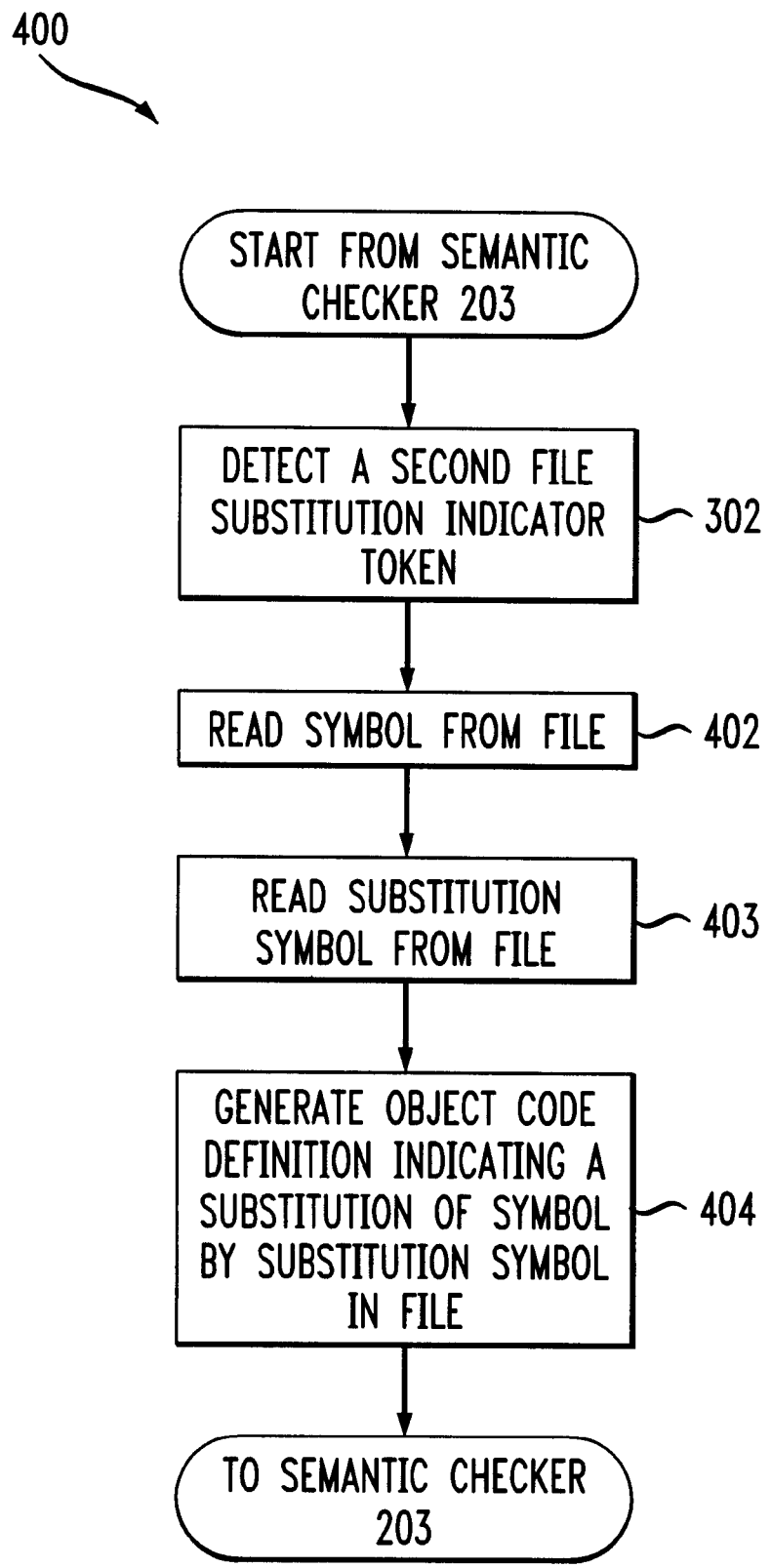
FIG. 4 illustrating a flow diagram for detecting a substitution indicator in a first file.

Process for Detecting a Substitution Indicator in a First File—FIG. 4

Process 400 illustrated by FIG. 4 is a process for detecting a linker substitution indicator. Process 400 is a process executed by semantic checker 203 when an indicator in detected in a file. Process 400 represents a change the lexicography rules in the compiler. One skilled in the art will be able to change the lexicography rules in compiler 200 to perform process 400. Process 400 begins in step 401 with a substitution indicator being detected in first file containing source code. In step 402, the symbol to be replaced is read from the expression containing the indicator and in step 403, the substitute symbol is read from the expression. In step 404, intermediate object code is generated and a linker substitution indicator is written to the intermediate object file for the first file.

Figure 5:
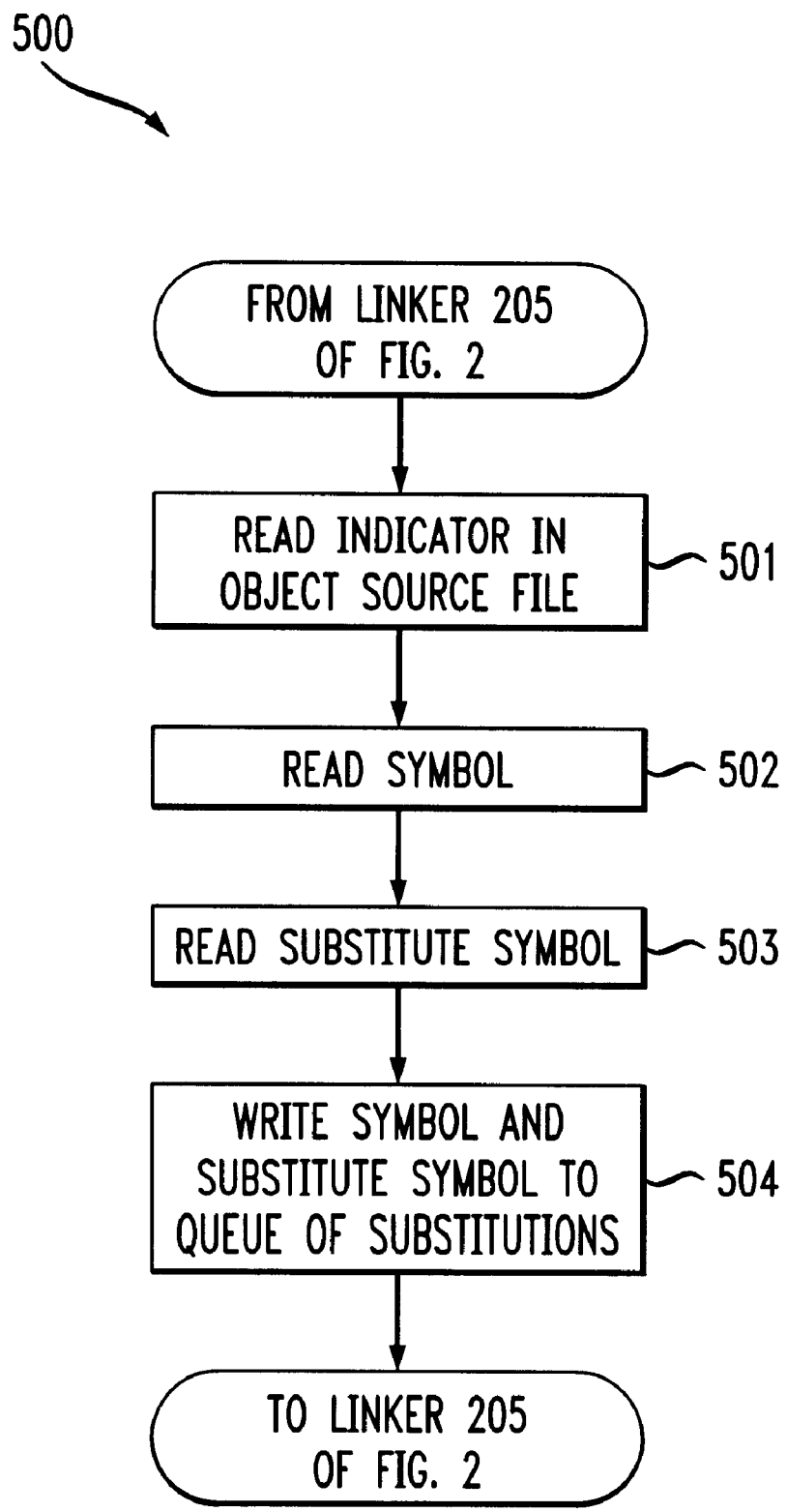
FIG. 5 illustrating a flow diagram for generating a replacement queue.

Process for Detecting Substitution Indicator in Linker 205—FIG. 5

Process 500 illustrated in FIG. 5 is the process in linker 205 for detecting a substitution is required in an intermediate object file. Process 500 is the process by which linker 205 detects that substitutions are required and generates a substitution queue to perform the substitutions. Process 500 executed every time a linker substitution indicator is read from an intermediate object code file that has been generated using process 400. A second process described below then performs the substitution.

Process 500 begins in step 501 with a linker substitution indicator being read from the intermediate object code of the first file. In step 502, the symbol to be replaced is read. The substitute symbol is then read in step 503. Process 500 ends in step 504 storing the symbol and substitute symbol in an entry in a substitution queue. Process 500 then returns to the main routine of linker 205 to complete the generation of the linked intermediate object file.

Figure 6:
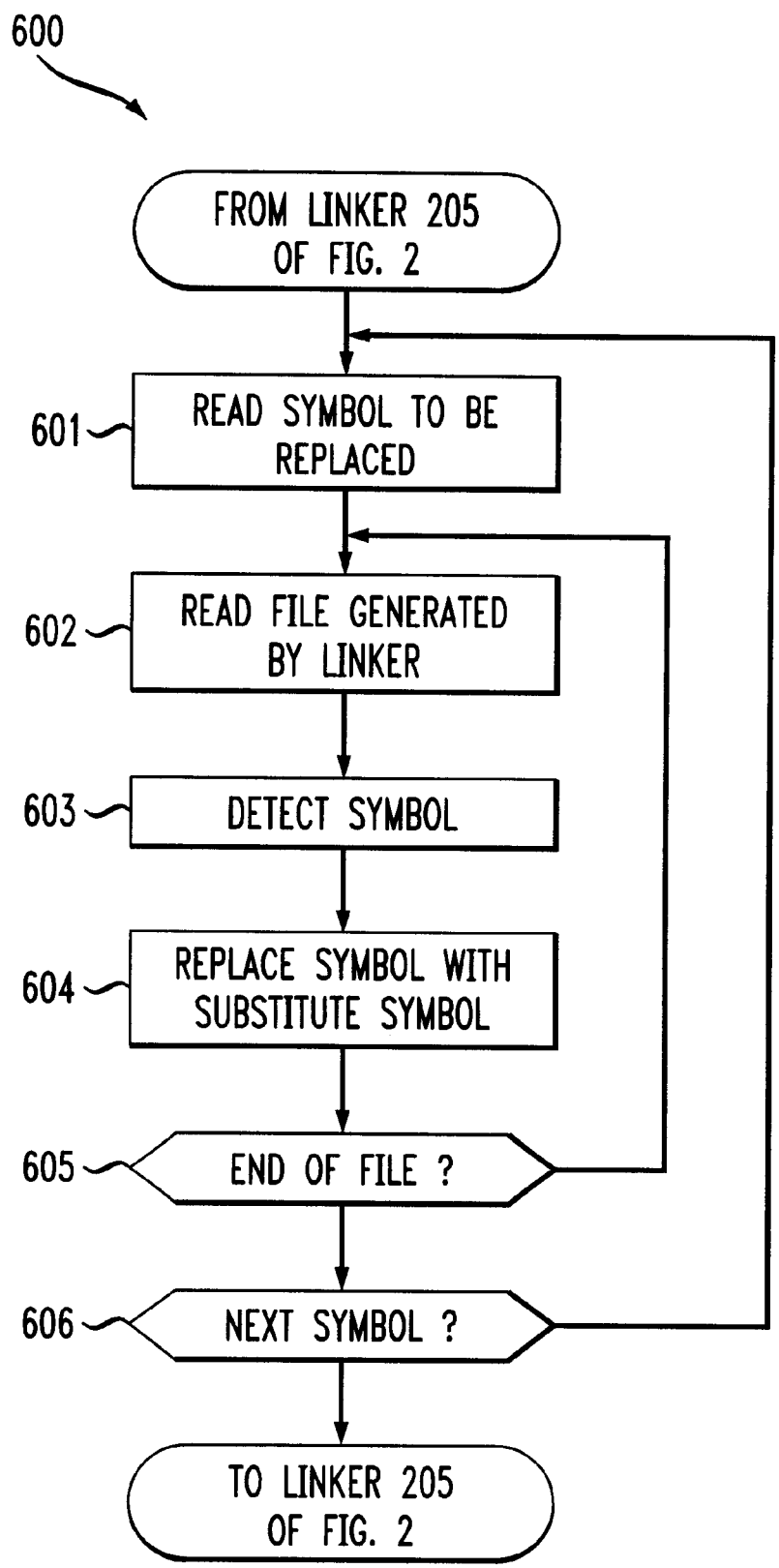
FIG. 6 illustrating a flow diagram for symbol substitution performed in a linker.

Process for Substituting a Substitute Symbol for a Symbol in the Linked Intermediate Object File—FIG. 6

Process 600 is an embodiment of a process that can be used to complete the substitution of symbols by linker 205. Process 600 is completed after all of the source intermediate object files and libraries have been added to the linked intermediate object file. It should be understood that one skilled in the art could design any number of processes for completing the substitutions.

Process 600 begins in step 601 by reading a symbol to be replaced from the substitution queue generated by process 500. In step 602, the corresponding substitute symbol is read. The linked object file is then read in step 603. When the symbol read in step 601 is detected in step 604, the symbol is replaced by the substitute symbol read in step 605. Linker 205 then determines whether the linker is at the end of the file in step 606. If linker 205 is not at the end of the file, steps 603–606 are repeated. Otherwise, linker 205 determines whether the substitution queue contains a next symbol. If the substitution queue does contain another symbol, process 600 is repeated from step 601. If the substitution does not contain another symbol, process 600 ends.

Figure 7:
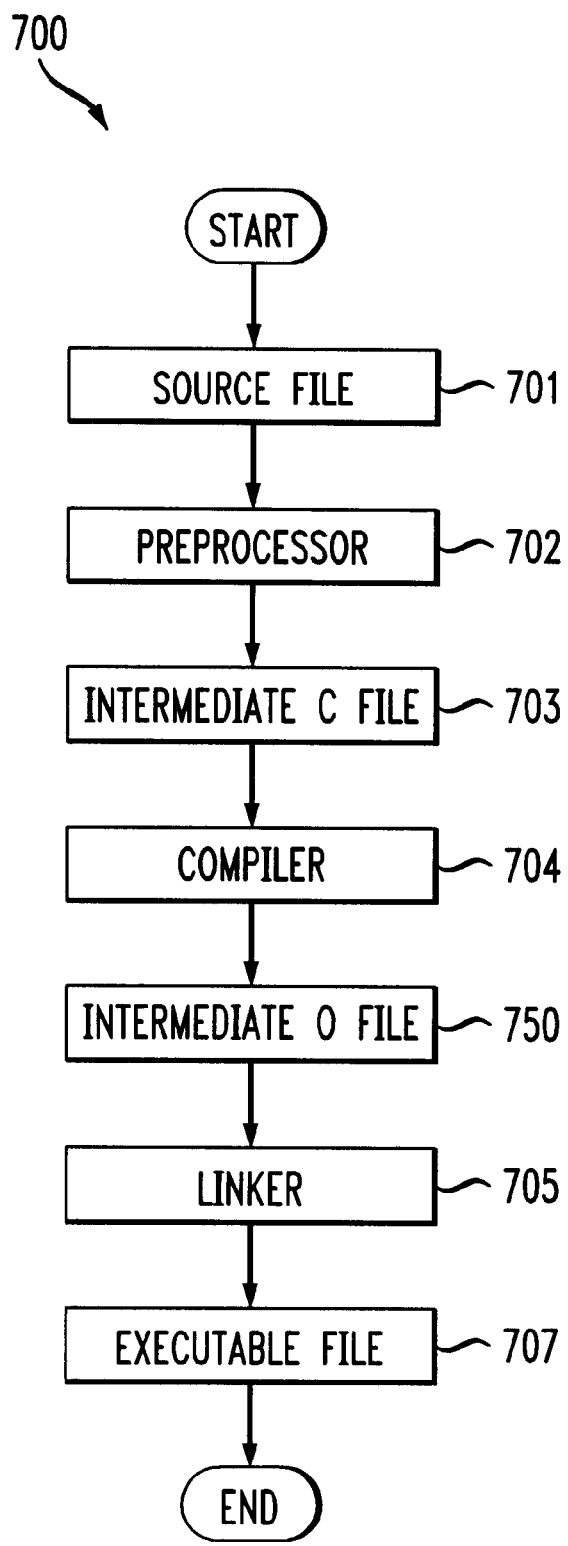
FIG. 7 illustrating a C++ language compiler that performs symbol renaming.

An Exemplary Embodiment of C++ Compiler That Provides Flat References in Accordance With the Present Symbol Renaming Process—FIG. 7

C++ Compiler 700 is illustrated in FIG. 7. C++ compiler 700 is a preferred exemplary embodiment of a compiler that can provide the symbol renaming of the linker in accordance to this invention. Files containing C++ code are converted into an executable file by C++ compiler 700. Source file 701 is received by preprocessor 702. Preprocessor 702 is a common C++ compiler software component that adds all of the included files and libraries into source file 701 to form intermediate C file 703. Compiler 704 receives the intermediate C file 703 and performs scanning, parsing, semantic checking, and intermediate code generating to produce symbol table 321, virtual function table 322 and an intermediate code file 350 for source file 701. Process 400 described above is performed by compiler is a routine added to the semantic checking in compiler 700 to detect a substitution indicator for substitution by the linker. The results of the compiler 704 are stored in an intermediate object file (.o file) 750. Linker 705 receives all of the intermediate object files 750 that are needed to produce an application and links the files into one linked file 751. It should be understood by those skilled in that translation, C compiling, and debugging software can be performed upon the intermediate object code generated by compiler 704. Linker 705 ensures that all imported and exported objects are declared, defined and in agreement. Linker 705 performs process 500 as linker substitution indicators are encountered and creates a linked intermediate object file and performs process 600 on linked intermediate object file. Linker 705 then generates the executable code in executable file 707 from the linked intermediate object files. Executable file 707 can be executed by computer system 100 to run the software application.

What is claimed is:

1. A system for compiling a software application from a plurality of source code files written in a programming language, comprising:

means for scanning a first source code file;

means, responsive to a scan of said first source code file, for detecting by a linker of a compiler a file substitution indicator written in said first source code file;

means, responsive to a detection of said file substitution indicator, for reading by a linker of a compiler data indicative of a symbol and a substitution symbol that is to be used in compiling said plurality of source code files; and means for substituting by a linker of a compiler said substitution symbol for each instance of said symbol that appears in executable code that is generated from the compilation of said first source code file with a second source code file.

2. The system of claim 1 wherein said means for substituting completes substitutions during a linking of said source code from said first source code file and said second source code file.

3. The system of claim 1 wherein said means for detecting occurs during a parsing of said first source code file.

4. The system of claim 1 wherein said second source code file contains intermediate object code.

5. The system of claim 4 wherein said first source code file contains source code written in said programming language.

6. The system of claim 1 wherein said means for detecting comprises:

means for reading a token in said first source code file that is said file substitution indicator;

means for reading said symbol;

means for reading said substitute symbol; and means, responsive to reading said substitute symbol and said symbol, for writing a linker substitution indicator, said symbol and said substitute symbol in an intermediate object code file generated from said source code in said first source code file.

7. The system of claim 6 wherein said means for substituting comprises:

means for generating a combined intermediate object code file from said intermediate object code file of said first source code file and said intermediate object code in said second source code file;

means for generating a substitution queue including said symbol and said substitution symbol; and means, responsive to a generation of said substitution queue, for completing said substitution of said substitution symbol for said symbol in a file containing said executable code.

8. The system of claim 7 wherein said means for generating said substitution queue comprises:
    means for reading said intermediate object code file of said first source code file;
    means, responsive to a reading of said intermediate object code file, for detecting said linker substitution indicator in said intermediate object code file of said first source code file;
    means, responsive to a detection of said linker substitution indicator, for reading said symbol said intermediate object file;
    means, responsive to said detection of said indicator, for reading said substitute symbol of said intermediate object file; and
    means, responsive to writing an entry into said substitution queue wherein said entry comprises said symbol to be replaced and said substitute symbol for said symbol.

9. The system of claim 6 wherein said means for completing said substituting comprises:
    means for detecting said indicator in said intermediate object code file of said first source code file;
    means, responsive to a detection of said linker substitution indicator, for reading said symbol;
    means, responsive to said detection of said linker substitution indicator, for reading said substitute symbol from said intermediate object code file of said first source code file;
    means for reading said combined intermediate object code file;
    means, responsive to reading said combined intermediate object code file, for detecting an occurrence of said symbol in said combined file; and
    means, responsive to a detection of said symbol in said combined intermediate object code file, for replacing said symbol with said substitute symbol.

10. The system of claim 9 further comprising:
    means, responsive to a replacement of said symbol, for determining whether the end of said combined intermediate object code file has been reached; and
    means, responsive to a determination that said end of said intermediate object code file has not been reached, for reading the remainder of said intermediate object code file and completing substitutions.

11. The system of claim 10 wherein said means for completing said substitutions further comprises:
    means for determining whether said substitution queue contains another substitution; and
    means, responsive to a determination that said substitution queue contains another substitution, for repeating said means for completing said substitutions.

12. A product for directing a computer to compile a plurality of source code files written in a programming language into an executable code for a software application, said product comprising:
    instructions, operational to scan a first source code file, to detect a file substitution indicator in said source code in said first source code file;
    instructions to read data indicative of a symbol and a substitution symbol that is to be used in compiling said plurality of source code files from said first source code file in response to a detection of said file substitution indicator;
    instructions to substitute said substitution symbol for each instance of said symbol that appears in executable code that is generated from the compilation of said first source code file and a second source code file; and
    a computer readable storage media for storing said instructions.

13. The product of claim 12 wherein a substitution of said substitution symbol for said symbol occurs in a linker that links source code from said first source code file with said second source code file into one executable file.

14. The product of claim 13 wherein said second source code file contains intermediate object code.

15. The product of claim 14 wherein said instructions to scan said first source code file are contained in instructions for a compiler that convert said source code in said first source code file into a file of said intermediate object code.

16. The product of claim 12 wherein said programming language is C++ programming language.

17. The product of claim 12 wherein said instructions for scanning said first source code file further comprise:
    instructions operational to detect a file substitution indicator in source code of a first source code file, to read said symbol, to read said substitute symbol, and to generate a linker substitution indicator in an intermediate object code file of said first source code file.

18. The product of claim 17 wherein said instructions to complete said substitution comprises:
    instructions operational to read said symbol from said substitution queue,
    instructions to read said substitute symbol from said substitution queue,
    instructions to read said combined intermediate object code file,
    instructions to detect an occurrence of said symbol in said combined intermediate object code file,
    instructions to replace said occurrence of said symbol with said substitute symbol.

19. The product of claim 18 wherein said instructions to complete said substitutions further comprise:
    instructions operational to determine whether the end of said combined intermediate object file has been reached, and
    instructions to read the remainder of said file responsive to a determination the end of said file has not been reached.

20. The product of claim 19 wherein said instructions to complete said substitutions further comprise:
    instructions operational to determine whether said substitution queue contains other substitutions, and
    instructions to repeat the instructions for completing substitutions responsive to a determination that said substitution queue contains other substitutions.

21. The product of claim 12 wherein said instructions for substituting comprise:
    instructions operational to generate a combined intermediate object code file form intermediate object code for said first source code file and intermediate object code from said second source code file, to generating a substitution queue; and
    instructions to complete substitutions in said substitution queue in said combined intermediate object code file.

22. The product of claim 21 wherein said instructions for generating said substitution queue comprise:
    instructions operational to read said intermediate object code for said first source code file,
    instructions to detect said linker substitution indicator in said intermediate code for said first source code file, instructions to read said symbol and said substitute symbol, and instructions to write an entry in a substitution queue wherein said entry comprises said symbol to be replaced and said substitute symbol for said symbol.

23. A method for compiling an executable software application from a plurality of source code files written in a programming language comprising the steps of:

scanning said source code written in a first source code file;

detecting by a linker of a compiler a file substitution indicator in said scanned source code;

reading by a linker of a compiler, in response to a detection of said file substitution indicator, data indicative of a symbol and a substitution symbol from said source code in said first source code file; and substituting by a linker of a compiler said substitution symbol for each instance of said symbol that appears in executable code that is generated from the compilation of said first source code file and a second source code file.

24. The method of claim 23 wherein said step of substituting completes all substitutions during a linking of said first source code file and said second source code file.

25. The method of claim 23 wherein said step of detecting occurs during a parsing of said first source code file.

26. The method of claim 23 wherein said second source code file contains intermediate object code.

27. The method of claim 26 wherein said first source code file contains code written in C++.

28. The method of claim 23 wherein said step of detecting comprises the steps of:

reading a token representing said file substitution indicator;

reading said symbol to be replaced;

reading said substitute symbol; and writing a linker substitution indicator, said symbol and said substitute symbol in an intermediate object code file for said first source code file responsive to reading said substitute symbol and said symbol.

29. The method of claim 28 wherein said step of substituting comprises the steps of:

generating a combined intermediate object code file from said intermediate object file for said first source code file and said second source code file;

generating a substitution queue responsive to generating said combined intermediate object code file;

completing said substitutions in said combined intermediate object file responsive to a generation of said substitution queue.

30. The method of claim 29 wherein said step of generating said substitution queue comprises the steps of:

reading said intermediate object code file for said first source code file;

detecting a linker substitution indicator in said first source code file responsive to a reading of said intermediate object code file;

reading said symbol from said intermediate object code file for said first source code file responsive to a detection of said linker substitution indicator;

reading said substitute symbol of said intermediate object code file responsive to said detection of said linker substitution indicator; and writing an entry into said substitution queue wherein said entry comprises said symbol to be replaced and said substitute symbol for said symbol.

31. The method of claim 29 wherein said step of completing said substituting comprises the steps of:

detecting said linker substitution indicator in said intermediate object code file of said first source code file;

reading said symbol responsive to a detection of said linker substitution indicator;

reading said substitute symbol from said intermediate object code file of said first source code file responsive to said detection;

reading said combined intermediate object code file;

detecting an occurrence of said symbol in said combined file responsive to a reading of said combined intermediate object code file; and replacing said symbol with said substitute symbol responsive to a detection of said symbol in said combined intermediate object code file.

32. The method of claim 31 wherein said step of completing said substitution further comprises the steps of:

determining, in response to a replacement of said symbol, whether an end of said combined intermediate object code file has been reached; and reading, in response to a determination that said end of said intermediate file has not been reached, the remainder of said intermediate object code file and completing substitutions.

33. The method of claim 32 wherein said step of completing said substitutions further comprises the steps of:

determining whether said substitution queue contains another substitution; and repeating said step of completing said substitutions in response to a determination that said substitution queue contains another substitution.

* * * * *